(12) United States Patent
Ofek et al.

(10) Patent No.: US 8,453,060 B2
(45) Date of Patent: May 28, 2013

(54) PANORAMIC RING USER INTERFACE

(75) Inventors: Eyal Ofek, Redmond, WA (US); Ricky Dean Welsh, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 729 days.

(21) Appl. No.: 11/467,532

(22) Filed: Aug. 25, 2006

(65) Prior Publication Data

US 2008/0066000 A1 Mar. 13, 2008

(51) Int. Cl.
*G06F 3/048* (2006.01)
(52) U.S. Cl.
USPC ........... 715/757; 715/769; 715/782; 715/797; 715/855
(58) Field of Classification Search
USPC .................................................. 715/757, 769
See application file for complete search history.

(56) References Cited

U.S. PATENT DOCUMENTS

| | | | |
|---|---|---|---|
| 6,563,529 B1 * | 5/2003 | Jongerius | 348/36 |
| 6,636,803 B1 * | 10/2003 | Hartz et al. | 701/459 |
| 7,076,505 B2 * | 7/2006 | Campbell | 707/104.1 |
| 7,174,301 B2 * | 2/2007 | Florance et al. | 705/313 |
| 7,228,136 B2 * | 6/2007 | Myllymaki et al. | 455/456.1 |
| 7,298,378 B1 * | 11/2007 | Hagenbuch et al. | 345/589 |
| 7,353,114 B1 * | 4/2008 | Rohlf et al. | 702/5 |
| 7,379,811 B2 * | 5/2008 | Rasmussen et al. | 701/532 |
| 7,441,201 B1 * | 10/2008 | Printezis | 715/762 |
| 7,526,718 B2 * | 4/2009 | Samadani et al. | 715/201 |
| 2002/0163547 A1 | 11/2002 | Abramson | |
| 2004/0044571 A1 * | 3/2004 | Bronnimann et al. | 705/14 |
| 2004/0128070 A1 | 7/2004 | Schmidt | |
| 2004/0128215 A1 * | 7/2004 | Florance et al. | 705/28 |
| 2004/0169724 A1 * | 9/2004 | Ekpar | 348/36 |
| 2005/0086612 A1 * | 4/2005 | Gettman et al. | 715/848 |
| 2005/0220361 A1 * | 10/2005 | Yamasaki | 382/284 |
| 2005/0223337 A1 * | 10/2005 | Wheeler et al. | 715/806 |
| 2005/0270311 A1 * | 12/2005 | Rasmussen et al. | 345/677 |
| 2006/0075442 A1 * | 4/2006 | Meadow | 725/91 |
| 2006/0195876 A1 * | 8/2006 | Calisa | 725/105 |

(Continued)

FOREIGN PATENT DOCUMENTS

| | | |
|---|---|---|
| JP | H11-122638 | 4/1999 |
| JP | 2000-193468 | 7/2000 |

(Continued)

OTHER PUBLICATIONS

International Search Report and Written Opinion dated Jan. 17, 2008.
European Search Report for EP 07836462.7 dated Apr. 3, 2010.

*Primary Examiner* — Daeho Song
(74) *Attorney, Agent, or Firm* — Shook Hardy & Bacon LLP

(57) ABSTRACT

A computer-readable medium and user interface for displaying media objects on a geographic map to a user are described. Indications from the user are received specifying a target location and a view direction on the geographic map. A database is accessed to retrieve media objects, either individually or in a panoramic view, that were captured in a geographic location in the proximity of the target location. The retrieved media objects are displayed on the map according to their geographic location from the target location. Enlarged versions of any of the retrieved media objects captured in the view direction from the target location are then presented to the user.

8 Claims, 10 Drawing Sheets

U.S. PATENT DOCUMENTS

| | | | |
|---|---|---|---|
| 2006/0250378 A1* | 11/2006 | Fabre et al. | 345/173 |
| 2007/0038945 A1* | 2/2007 | Miller et al. | 715/760 |
| 2007/0070190 A1* | 3/2007 | Yin et al. | 348/36 |
| 2007/0176795 A1* | 8/2007 | Matsubara | 340/995.1 |
| 2007/0233367 A1* | 10/2007 | Chen et al. | 701/207 |
| 2008/0016472 A1* | 1/2008 | Rohlf et al. | 715/848 |
| 2008/0291217 A1* | 11/2008 | Vincent et al. | 345/629 |
| 2008/0292213 A1* | 11/2008 | Chau | 382/294 |
| 2009/0031246 A1* | 1/2009 | Cowtan et al. | 715/786 |

FOREIGN PATENT DOCUMENTS

| | | |
|---|---|---|
| JP | 2003-227722 | 8/2003 |
| JP | 2003-242152 | 8/2003 |
| JP | 2006-072068 | 3/2006 |
| JP | 2006-200995 | 8/2006 |
| WO | WO 0060440 A1 | 10/2000 |

* cited by examiner

PANORAMIC RING USER INTERFACE

BACKGROUND

The Internet has become an increasingly popular tool for locating geographic locations. Popular map services, such as MapQuest®, present interactive maps that users can use to locate a specific location. By simply providing a street address or identifying an intersection, one can quickly map the location. While such services provide an accurate map, they do not tell the user anything about what the location actually looks like.

Today's map services are going one step beyond generating a map. In addition to mapping locations, traditional map services are displaying aerial photographs or satellite images of various locations. For example, on-line services such as Windows® Live Local Search or Google® Maps provides an aerial view of nearly every location on the planet. Aerial views, however, only provide a limited view of a given location, making it difficult to understand exactly what is being viewed.

Another exemplary service, offered by Amazon's A9® or the technology preview of Windows® Live local, enables a user to select a location on a map within a list of cities and browse through photographs of that location. The photographs for the selected location are presented to the user in a slideshow. The slideshow simply displays the photographs, however, the direction each photograph was taken from or the time, angle, or perspective of each photograph is not provided. As a result, it is difficult for the user to ascertain what the location actually looks like.

For example, suppose a user selects an intersection of two roads to view. The corresponding photographs associated with that intersection would then be displayed. But without knowing which direction the photographs were taken, the user cannot determine where objects depicted in the photographs are located. Consequently, the user must guess what the specified location actually looks like from the images provided. In addition, the photographs may not be current, showing objects at the intersection that no longer exist. Or the user may wish to view photographs of the intersection from years ago. Thus, today's map services provide no such flexibility, and the user experience suffers because the perspective of what is being viewed cannot accurately be determined.

Furthermore, today's interactive map services do not provide a way to interact with a panoramic (360°) image such that a user can determine the actual location of the scene displayed by the panorama. Traditionally, when panoramic images are displayed on an interactive map, they are commonly displayed with a specific view direction that can be selectively changed. One example of such an image is the "virtual tour" feature used in many web sites for apartment and house listings. A user can interact with a panoramic display and change its view direction. However this experience is disjoint from the map. In an analog case to the case of viewing street-side images, the user had to mentally map the images, to position and orientation in the map.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are directed to a user interface and computer-readable medium for displaying one or more media objects related to a geographic target location on an interactive map to a user. A target location is indicated (e.g., by a user selecting a point on the map referring to a geographic location) corresponding to a geographic location on the interactive map, or by sensing the current position of the user—for example, with a Global Positioning System ("GPS") device. A database is then accessed to retrieve media objects or panoramic images captured at geographic locations near the target location. Once retrieved, the media objects are positioned and displayed on the interactive map in the respective directions from the target location that each of the media objects was captured. The user indicates a view direction from the target location. Enlarged versions of the media objects with a geographic location in the view direction from the target location are then displayed. Embodiments are also directed to a user interface for displaying the interactive map, target location, view direction, retrieved media objects, and enlarged version of media objects in the view direction.

BRIEF DESCRIPTION OF THE SEVERAL VIEWS OF THE DRAWINGS

The present invention is described in detail below with reference to the attached drawing figures, wherein.

DETAILED DESCRIPTION

The subject matter described herein is presented with specificity to meet statutory requirements. However, the description herein is not intended to limit the scope of this patent. Rather, it is contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In general, embodiments described herein relate to an interactive map to display media objects around a selected target location. Media objects can be described as any form of stored electronic media stored—such as, for example, digital photographs, digital audio files, digital video, etc. Media objects may be stored as any RAW image file, JPEG file, TIFF file, or the like.

Embodiments should not be limited, however, to any particular type of media object, as numerous types are evident to one skilled in the art.

Having briefly described a general overview of the embodiments described herein, an exemplary operating environment is described below.

Figure 1:
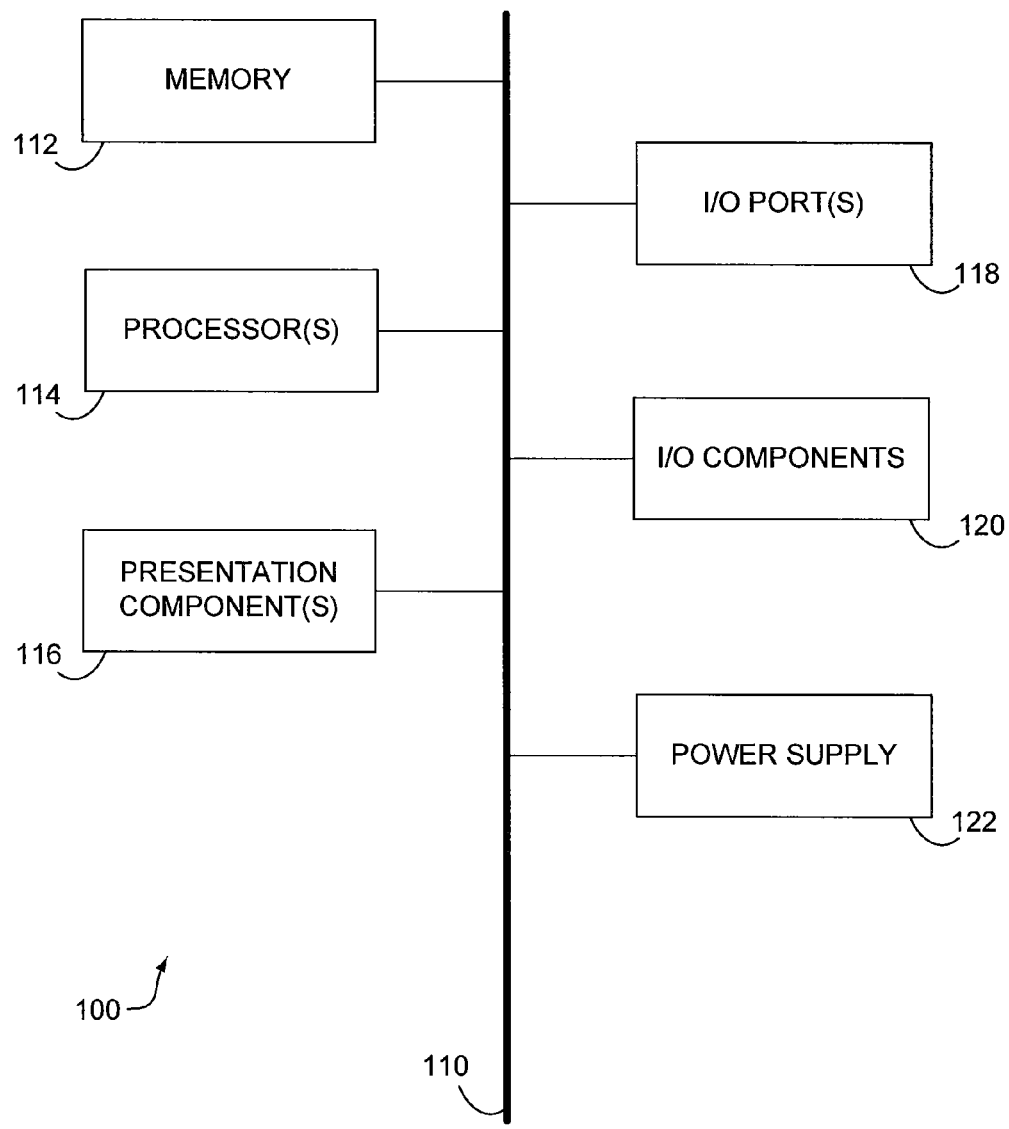
FIG. 1 is a block diagram of a computing-system environment for use in implementing an embodiment of the present invention.

Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In one embodiment, computing device 100 is a personal computer. But in other embodiments, computing device 100 may be a cell phone, digital phone, handheld device, personal digital assistant ("PDA"), or other device capable of executing computer instructions.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, and the like, refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
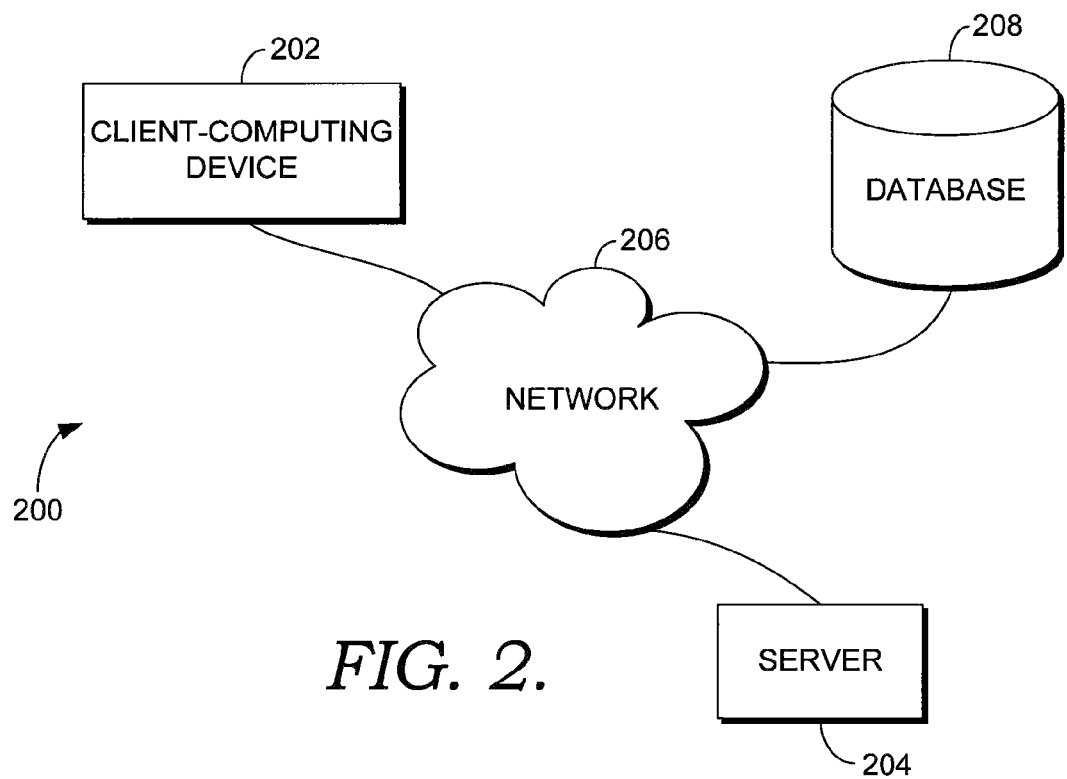
FIG. 2 is a block diagram of a networking environment for use in implementing an embodiment of the present invention.

FIG. 2 illustrates a block diagram of a networking architecture for use in implementing an embodiment of the present invention. The networking architecture, generally referenced by numeral 200, comprises a client-computing device 202, server 204, and a database 208 which communicate via a network 206. It will be appreciated by one of ordinary skill in the art that networking architecture 200 is merely an example of one suitable networking environment and is not intended to suggest any limitation as to the scope of use or functionality of the present invention. Neither should networking architecture 200 be interpreted as having any dependency or requirement related to any single component or combination of components illustrated therein.

The client-computing device 202 may be any type of computing device, such as device 100 described above with reference to FIG. 1. By way of example only and not limitation, the client-computing device 202 may be a personal computer, desktop computer, laptop computer, handheld device, cellular phone, digital phone, PDA, or the like. It should be noted that the invention is not limited to implementation on such computing devices, but may be implemented on any of a variety of different types of computing devices.

Network 206 may include any computer network or combination thereof. Examples of computer networks configurable to operate as network 206 include, without limitation, a wireless network, landline, cable line, fiber-optic line, LAN, WAN, or the like. Network 206 is not limited, however, to connections coupling separate computer units. Rather, network 206 may also comprise subsystems that transfer data between servers or computing devices. For example, network 206 may also include a point-to-point connection, tan internal system Ethernet, a backplane bus, an electrical bus, a neural network, or other internal system. In an embodiment where network 206 comprises a LAN networking environment, components are connected to the LAN through a network interface or adapter. In an embodiment where network 206 comprises a WAN networking environment, components use a modem, or other means for establishing communications over the WAN, to communicate. In embodiments where network 206 comprises a MAN networking environment, components are connected to the MAN using wireless interfaces or optical fiber connections. Such networking environments are commonplace in offices, enterprise-wide computer networks, intranets, and the Internet. It will be appreciated that the network connections shown are exemplary and other means of establishing a communications link between the computers may also be used.

The server 204 may include any type of application server, database server, or file server configurable to perform the methods described herein. In addition, the server 204 may be a dedicated or shared server. One example, without limitation, of a server that is configurable to operate as the server 204 is a structured query language ("SQL") server executing server software such as SQL Server 2005, which was developed by the Microsoft® Corporation headquartered in Redmond, Wash.

Components of server 204 (not shown for clarity) may include, without limitation, a processing unit, internal system memory, and a suitable system bus for coupling various system components, including one or more databases for storing information (e.g., files and metadata associated therewith). Each server typically includes, or has access to, a variety of computer-readable media. By way of example, and not limitation, computer-readable media may include computer-storage media and communication media. In general, communication media enables each server to exchange data via network 206. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that networking architecture 200 is merely exemplary. While the server 204 is illustrated as a single box, one skilled in the art will appreciate that the server 204 is scalable. For example, the server 204 may in actuality include 100 servers in communication. Moreover, the database 208 may be included within the server 204 of or a client-computing device 202 as a computer-storage medium. The single unit depictions are meant for clarity, not to limit the scope embodiments in any form.

In operation, a user interacts with the client-computing device 202 via a graphical user interface. In one embodiment, the graphical user interface utilizes a web browser to access a map service executing on the server 204. In alternative embodiments, the graphical user interface accesses the map service via an application executing on the client-computing device 202. For example, the map service may be incorporated into an application such as Microsoft® Pocket Streets 2005. In other embodiments, the server 204 or the database 208 may be implemented on the client computing device 202. In such configurations, there is no need for the network 206.

In an embodiment, the map service is a web service configured to support interoperable machine-to-machine communication between the client-computing device 202 and the server 204. In an alternative embodiment, the map service includes an application programming interface ("API") configurable to access the database 208. Examples of such APIs include, without limitation, active data objects ("ADO"), remote data objects ("RDO"), and the like. In an alternative embodiment, the client-computing device 202 contains a client application, the map service and relevant map data.

Figure 3A:
FIGS. 3A-3C are exemplary displays of a user interface for an interactive geographical map, according to embodiments of the present invention.
Figure 3B:
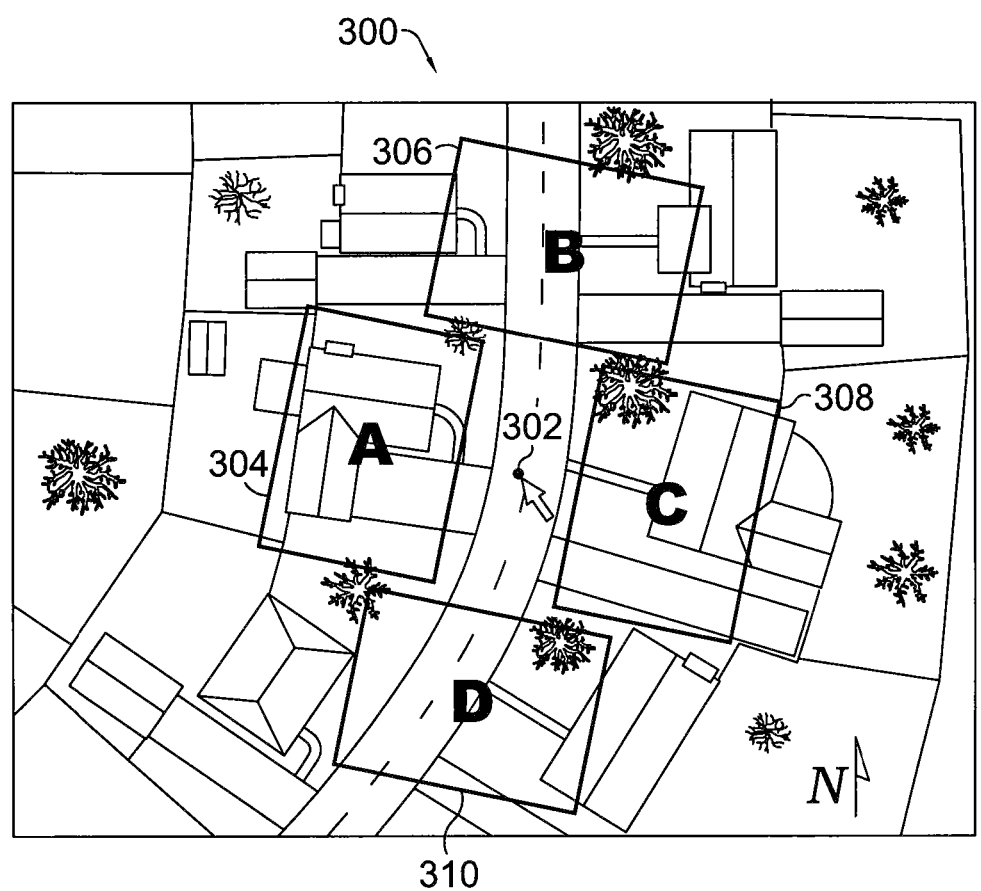
Figure 3C:
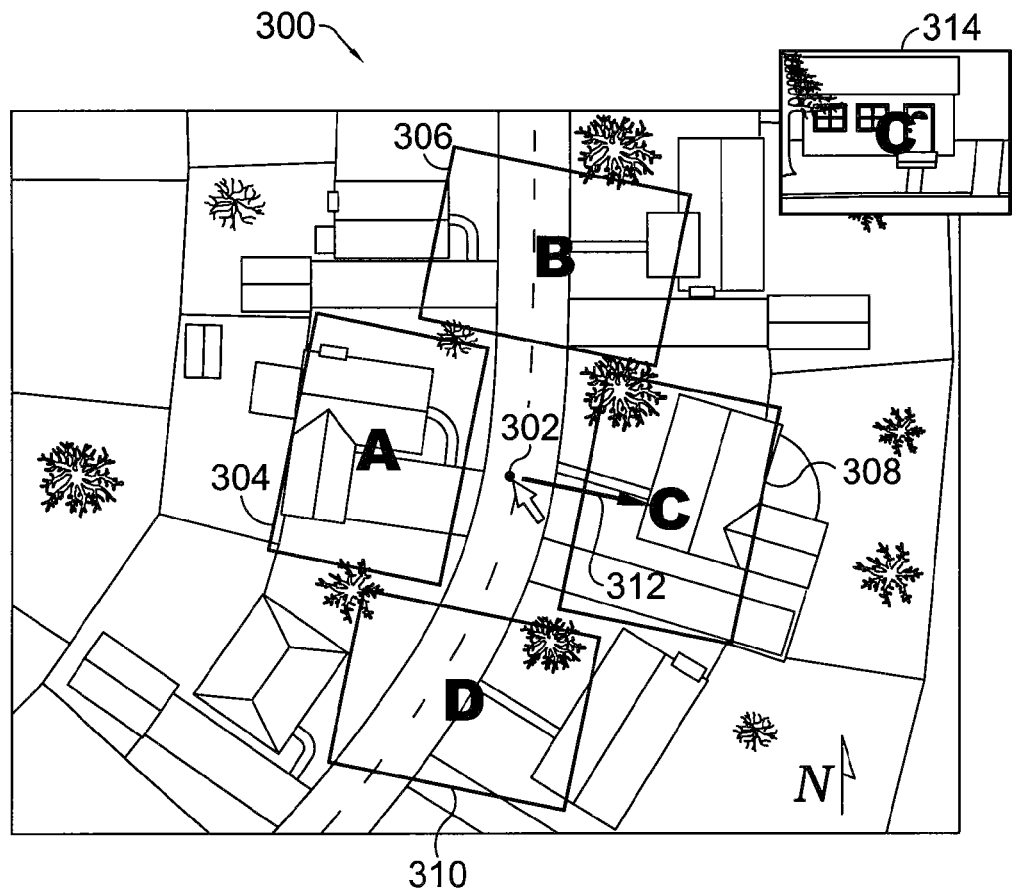

FIGS. 3A-3C illustrate exemplary displays of a user interface for an interactive geographical map generated by the map service, according to embodiments of the present invention. The interactive geographical map may be any electronic display of geographic locations displayed on a computing device—such as, for example, a topographic map, road map, map of aerial photographs, physical map, resource map, climate map, low-oblique map, high-oblique map, online map, vector map, bit map, global map, or the like. The interactive map described herein is displayed on the client-computing device 202. A user can interact with the displayed map using well known input components—such as, for example, a mouse, joystick, stylus, touch screen, or the like.

In operation, the map service displays an interactive map (generally referenced in as 300) depicting geographic locations on the client-computing device 202. The user can indicate a target location 302 (illustrated in FIG. 3B) on the interactive map through various methods well known to those skilled in the art. For instance, a user may enter a street address into a text field, select a point with a mouse pointer, zoom in and out of a region using a slide bar, select a hyperlink from an independent web site, touch a touch screen, or utilize a track wheel. Furthermore, the target location 302 may be any geographic location on a map selected by the user.

Alternatively, the target location 302 may be indicated by an administrative user who manages the interactive map. For instance, the administrative user may specify multiple points on a map designating points of interest in a given city with associated media objects displayed around the different points. In that situation, each point of interest would be a target location 302. It will be understood that the target location 302 also may be designated through another method of managing a web site or interactive map well known to those skilled in the art. Once indicated, the target location 302 is displayed in the user interface on the map in a display area, as indicated by the point in FIG. 3B.

Once the user selects the geographic location, the map service is configured to retrieve media objects in proximity to the target location from the database 208. The database 208 is a computer-storage medium that is accessible by the map service and configurable to store media objects along with their associated metadata for a myriad of geographic locations. The metadata may include various parameters, such as date, time, title, location, angle, clarity, quality, or any other distinguishing characteristic. For example, a photograph of a historic landmark may be captured by a digital camera with Global Positioning System ("GPS") functionality that geocodes the photograph by automatically storing longitude and latitude information in the Exchangeable Image File ("EXIF") format within the photograph's file. Moreover, additional methods for tagging media objects with various parameters are well known to those skilled in the art and may be employed in alternative embodiments.

In an embodiment, the map service then locates media objects stored in the database 208 that illustrate images around the target location 302. Such a determination can be made by comparing the stored parameters of captured media objects to ascertain those taken at a location in the proximity of the target location 302. For example, the latitude and longitude parameters of media objects stored in the database 208 corresponding with the latitude and longitude on the map can be compared with the latitude and longitude parameters of the target location 302. In one embodiment, media objects—or versions of the media objects, such as thumbnail versions—retrieved from the database 208 are displayed around the target location on the interactive map according to their orientation to the target location 302.

For example, FIG. 3B depicts media objects 304, 306, 308, and 310, which respectively are images from the target location 302 to the west, northeast, east, and southwest. Accordingly, the map service is configured to display these media objects around the target location in the direction they were taken with respect to the target location. For example, a photograph by an individual standing at the target location 302 while the individual was facing east would be located like media object 308 in FIG. 3B. Moreover, the located media objects are presented in one or more display areas on in the user interface on the map, as indicated in FIG. 3B with reference to media objects 304, 306, 308, and 310. In one embodiment, the size of media objects 304, 306, 308 and 310 may represent the view angle of the media object. For example, if 304 is taken by a camera with view angle of 40 degrees, then 304 will be display at a size that illustrates an angle of 40 degrees from the target location 202.

Additionally, the user may indicate a view direction 312 (illustrated in FIG. 3C) to organize media objects around the target location 302. The view direction 312 can be indicated by the user, in one embodiment, by a single gesture—such as dragging a mouse pointer in a specific direction, designating a cardinal direction on a compass, dragging a stylus across a touch screen, revolving a wheel, selecting another location in addition to the target location 302, or any other such indication. The map service is configured to display a larger version of the media object in the view direction 312 from the target location 302. As is illustrated in FIG. 3C, when the view direction 312 is designated to the east, a larger version 314 of the media object 308 is displayed in a display area on the user interface. This enables the user to view media objects from a desired perspective. It will be appreciated that a user may use a single gesture in any direction and the media object closest to the associated direction is displayed. For example, if a user indicates a due north direction in FIG. 3C a larger version of media object 306, which is in a northeastern view will be displayed.

The user may wish to restrict the number of media objects presented around the target location 302 by a specific parameter. For instance, the user may only wish to view the most recent photographs. Or the user may only wish to view images from two years ago. Alternatively, the user may wish to view images taken at a specific picture quality. In one embodiment, the web service provides options (not pictured in FIGS. 3A-3C for clarity)—such as a menu option, text entry, pick menu, or the like—for restricting displayed media objects by a parameter, such as time, quality, clarity, location, angle, and direction. In operation, the web service uses the parameters as an additional search criteria for searching the database 208 for media objects. Consequently, only the images satisfying the parameters are displayed around the target location 302. Alternatively, the user interface may be configured to display multiple media objects in the same view direction sorted by the parameter. For example, if there are seven photographs taken to the east of the target location 302 of a different quality may be presented east of the target location 302, and they may be layered over one another with the photograph of highest quality being media object 308.

As previously mentioned, traditional methods of viewing panoramic images do not provide a method for determining the geographic orientation of a scene displayed in a panorama. For example, a user viewing a panoramic image taken in between four adjacent buildings on a college campus cannot tell which building stood to the north, south, east, or west. In another example, if the user is permitted to view the panoramic image interactively by selectively changing the viewing direction (such as in a "virtual tour"), the user still could not decipher the geographic orientation of the image. In both examples, the user could see what each building looked like, but has no idea where the building is located.

Figure 4A:
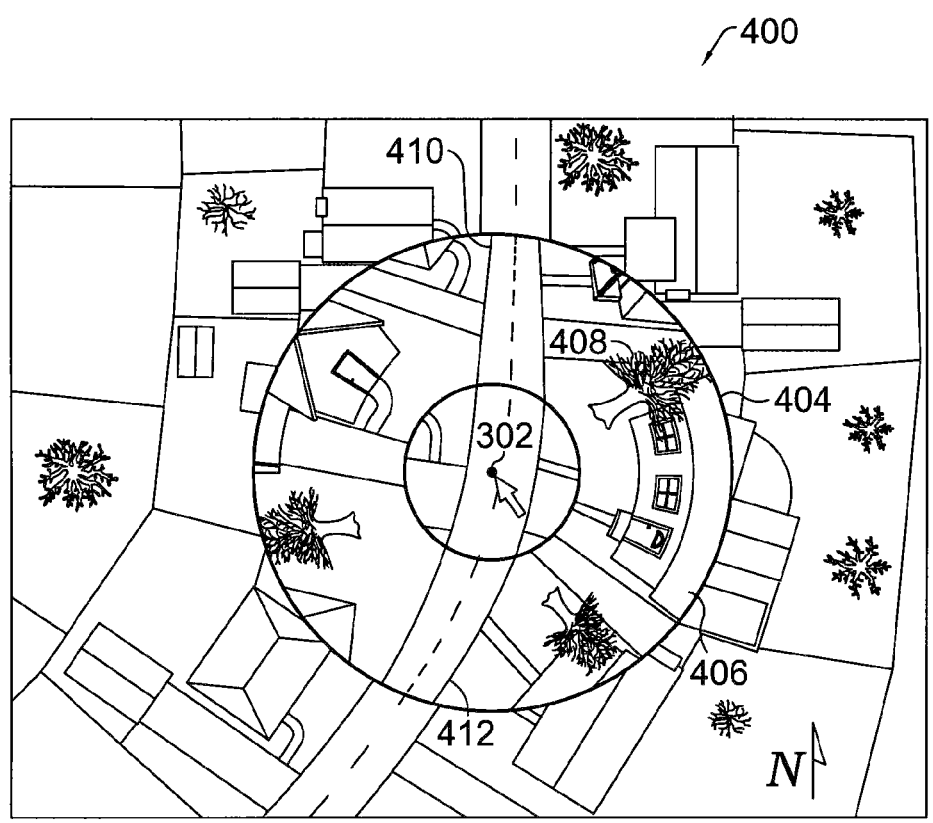
FIGS. 4A-4C are exemplary displays of a user interface for an interactive geographical map to display a panoramic image, according to embodiments of the present invention.
Figure 4B:
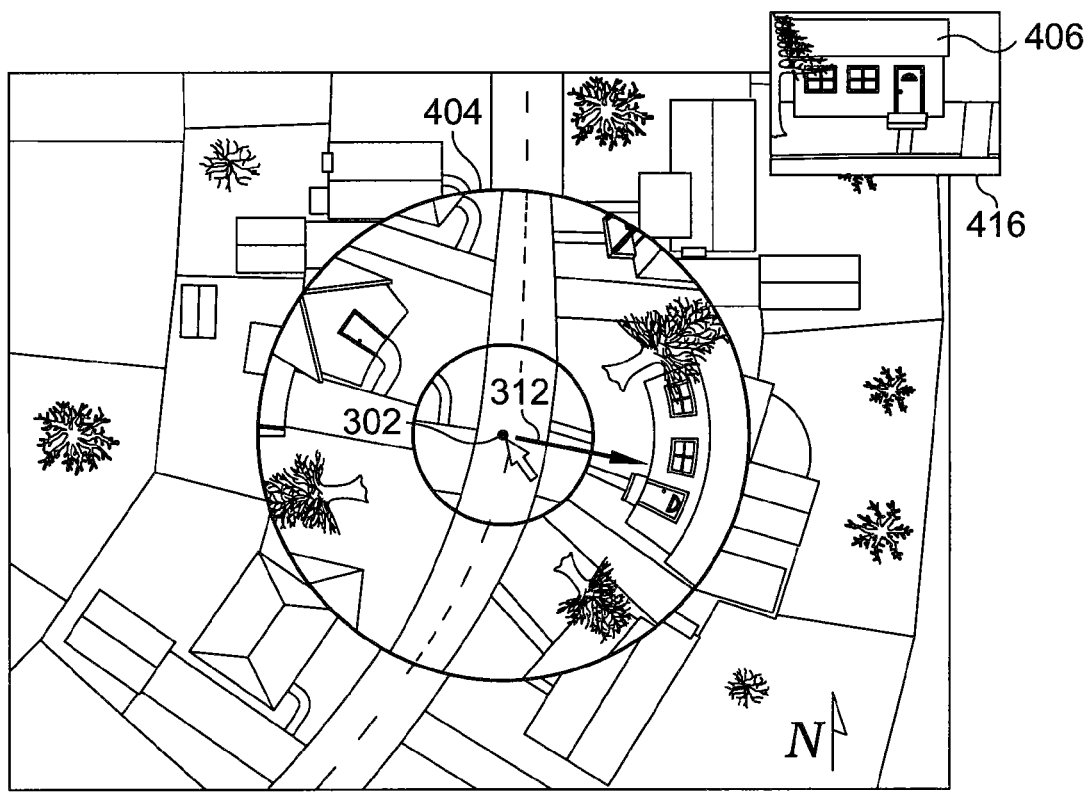
Figure 4C:
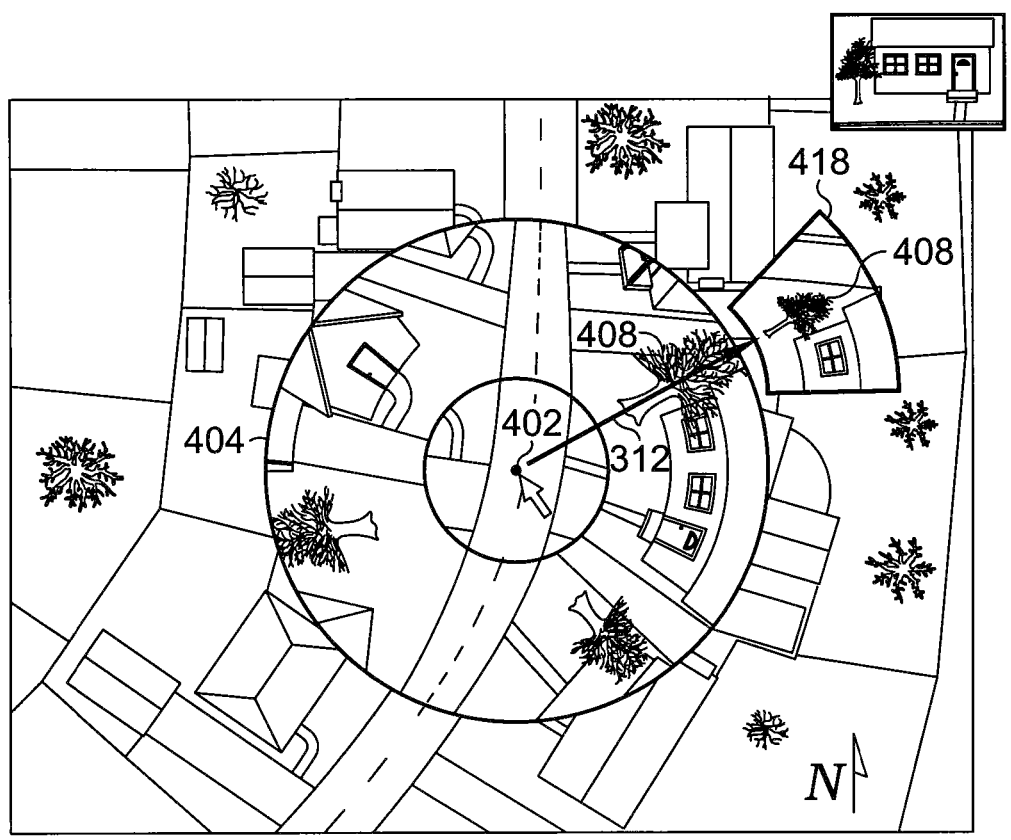

FIGS. 4A-4C are exemplary displays of a user interface for an interactive geographical map to display a panoramic image, according to embodiments of the present invention. The map service described herein is also configurable to present panoramic images. To do so, the user selects the target location 302 in the same manner as previously described. The user also indicates in a menu option (not shown for clarity) a desire to view a panoramic image 404 around the target location 302.

The web service may generate the panoramic image 404 around the target location in a number of ways well known to those of skill in the art. For example, the panoramic image 404 may be stored in database 208 as a panoramic image with a geocode close to the target location 302—in which case the panorama is simply retrieved. Such images may be captured by a panoramic camera, such as the Mark III by Panoscan®.

Alternatively, the web service may construct a panoramic images from a plurality of individual images. In one embodiment, the map service is configured to search the database 208 for individual images with geocodes indicating that the images surround the target location 302. The map service then affixes each image to one another to create a panoramic image. Other methods for assembling or retrieving panoramic images may also be used and are generally well known to those of skill in the art.

Referring to FIG. 4B, once the panoramic image is presented to the user, the user may indicate the viewing direction 312 from the target location 302 in any of the aforementioned manners. As a result, an enlarged image 416 of a portion of the panoramic image 404 in the viewing direction is displayed to the user.

With reference to FIG. 4C, the user may also indicate parameters to view images in the panoramic image 404. For example, suppose a user wished to view an image of a tree depicted in the panoramic image 404 as it looked ten years ago. By indicating a time for viewing the image and the specified direction 312, the web service could locate and display a ten-year-old image 418 of the tree 408. It will be understood that any of the above parameters (e.g., time, direction, angle, quality, etc.) may also be used in the same manner.

In an embodiment, additional media objects with different parameters may be displayed as portion of a ring beyond the panoramic image 404. For example, with reference to FIG. 4C, the ten-year-old image 418 is displayed as a portion of a further panoramic image beyond the panoramic image 404. This indicates to the user that the ten-year-old image 418 was taken at a different time than the panoramic image 404.

A similar method of indicating separate media objects of the same location but with different parameters can also be used with still media objects. For example, with reference to FIG. 3C, a photograph taken at a different angle than media object 308, can be displayed further to the east of the target location 302 than media object 308. Alternatively, media objects can be displayed around the target location 302 at distances relative to the images captured therein. For example, media objects 304, 306, 308, and 310 may be positioned away from the target location 302 at distances corresponding to the actual distances the images captured in the media objects lie away from the target location 302. As previously mentioned, it will be understood that any of the aforementioned parameters may also be used in the same manner.

Figure 5:
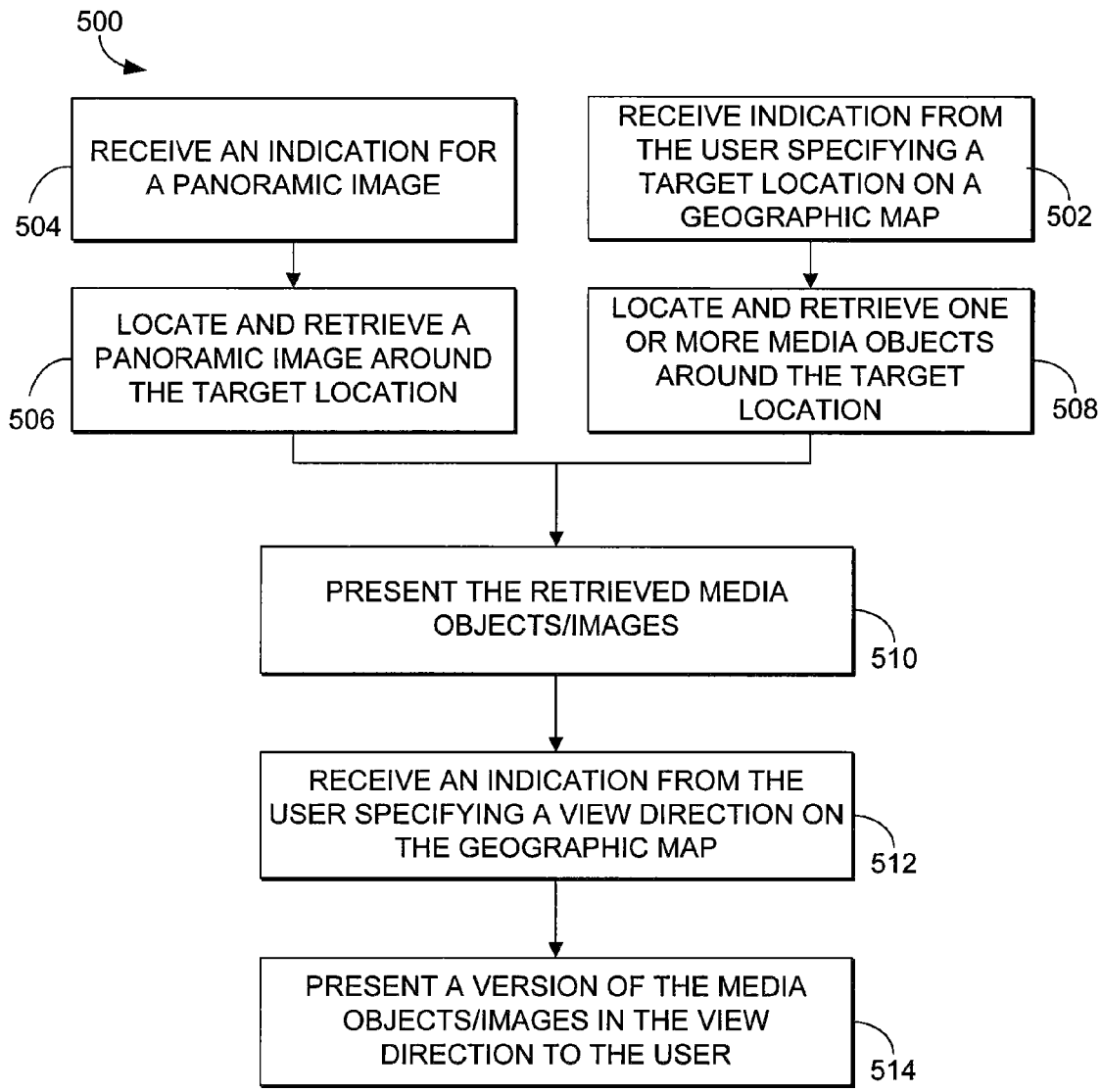
FIG. 5 is a flow diagram illustrating a method for presenting media objects or panoramic images to a user, according to embodiments of the present invention.

With reference to FIG. 5, a flow diagram is illustrated showing a method 500 for presenting media objects or panoramic images to a user in accordance with an embodiment of the present invention. Initially, an indication from a user specifying a target location on a geographic map is received, as indicated at 502. The indication may be sent, for example, by selecting a location on the map randomly or when a target location already has media objects displayed around it (e.g., an administrator has designated points of interest for a city). In one embodiment, an indication for a panoramic image is independently received, as indicated at 504.

Subsequently, a database (e.g., database 208) is searched in order to retrieve either a panoramic image, one or more media objects, or a combination thereof around the target location, as indicated at 506 and 508. In one embodiment, parameters of the media objects in the database are compared with the parameters of the target location to find media objects in the same proximity. As previously mentioned, such parameters may include geographic location, geocodes, time, data, clarity, resolution, angle, etc. In another embodiment, media objects/images are around the target location are found by comparing the latitude and longitude of the media objects in the database with the latitude and longitude of the target location.

The retrieved media objects/image are then presented to the user, as indicated at 510, on the map via a user interface. They may be positioned on the map such that each media object is placed in the direction from the target location that the media object was captured. In one embodiment, the media objects are presented in a similar fashion to that depicted in FIG. 3B. In another embodiment, a retrieved panoramic image is presented in a similar fashion to that depicted in FIG. 4A.

The user can also indicate a view direction from the target location on the geographic map, as indicated at 512, by a gesture. In one embodiment, the user drags a mouse pointer in a certain direction to indicate the view direction. Alternatively, the user selects an end location on the map and the view direction is calculated from the target location to the end location. The view direction can be indicated by any of the aforementioned gestures. It will be understood by those skilled in the art that various other methods may also be used. Next, a version of the one or more media objects/images in the view direction are presented to the user, as indicated at 514.

Figure 6:
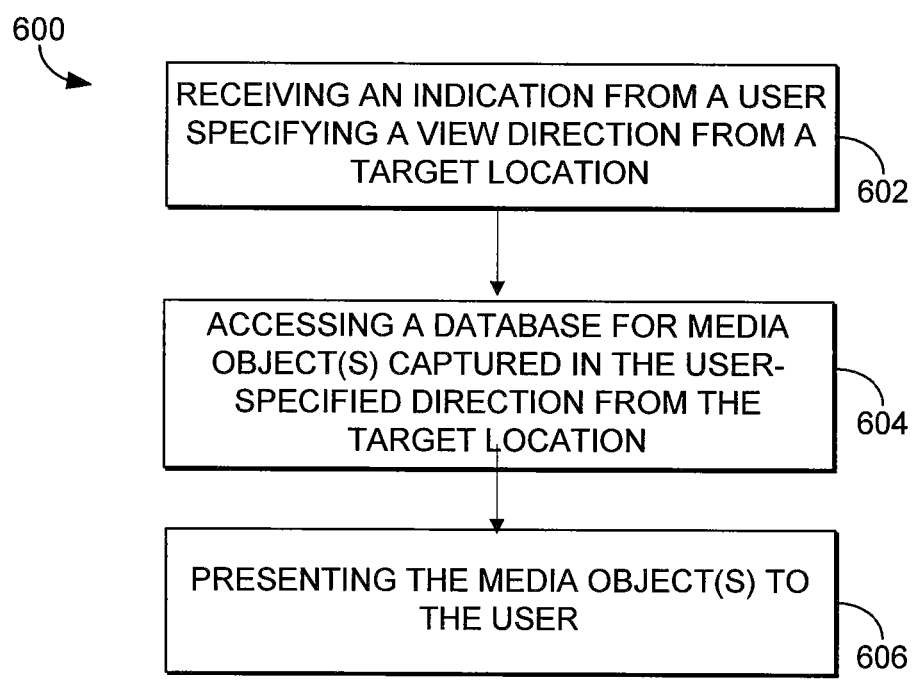
FIG. 6 is a flow diagram illustrating a method for presenting media objects to a user, according to embodiments of the present invention.

With reference to FIG. 6, a flow diagram is illustrated showing a method 600 for presenting media objects to a user, according to embodiments of the present invention. Initially, an indication from a user specifying a view direction is received, as indicated at 602. The view direction may be indicated by any of the aforementioned methods.

Then, a database is accessed for one or more media objects captured in the user-specified direction from the target location, as indicated at 604. The media objects can be found in the database using any of the aforementioned methods, such as comparing latitudes and longitudes of saved media objects or comparing various other parameters.

Once found, enlarged versions of the media objects are presented to the user in display areas of a graphical user interface. Such versions may include, for example, thumbnail versions, full screen versions, separate displays, or any other depiction of a media object.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. One or more computer-readable memory device having embodied thereon computer-executable instructions for performing a method of displaying media objects on an interactive map that depicts a target location, comprising:
    providing an identification of the target location to an image database, wherein the target location represents a geographic location;
    receiving a plurality of media objects, each of which depicts a respective image captured from a respective view direction away from the geographic location, wherein a portion of the plurality of media objects includes images captured from a same respective view direction away from the geographic location; and
    displaying, in an overlaying manner on top of, over top of the interactive map, a respective thumbnail version of each media object included in the plurality of media objects, wherein each respective thumbnail version is displayed to include an orientation with respect to the target location that reflects the respective view direction, wherein thumbnails of the portion of the plurality of media objects are displayed as a stack of thumbnails that partially overlap one another and represent the images captured in the same respective view direction;
    wherein a plurality of thumbnail versions are simultaneously displayed at respective orientations and in a configuration that surrounds the target location, such that multiple view directions are simultaneously presented.

2. The computer-storage media device of claim 1, wherein the target location is specified by one of either an indication from a user or an administrator.

3. The computer-storage media device of claim 1, wherein an input is received in response to a user dragging a mouse pointer in a direction on the geographic map, thereby indicating a selection of a media object, and wherein in response to the input an enlarged version of the media object is displayed.

4. The computer-storage media device of claim 1, further comprising:
    receiving an indication of one or more parameters;
    searching for at least one of the one or more media objects that contains the one or more parameters; and
    presenting the at least one of the one or more media objects that contains the one or more parameters.

5. The computer-storage media device of claim 1, wherein the plurality media objects are identified in the image database by searching the image database for media objects assigned a geocode in the proximity of the target location.

6. The computer-storage media device of claim 1, further comprising:
    receiving an indication for a panoramic image around the target location;
    locating the panoramic image around the target location; and
    displaying the panoramic image on the geographic map around the target location.

7. A method of displaying media objects on an interactive map that depicts a target location, the method comprising:
    retrieving a panoramic image that includes a plurality of images captured from respective view directions away from a geographic location,
        wherein the panoramic image is retrieved by providing to an image database an identification of the target location, which represents the geographic location, and
        wherein one image of the plurality of images depicts a subject matter at an instance in time;

displaying in front of the interactive map a circular presentation of the panoramic image, such that the plurality of images are oriented in the respective view directions away from the target location, wherein the target location is displayed on the interactive map in a center portion of the circular presentation, such that the interactive map and the panoramic image are simultaneously displayed;

receiving an input of a parameter that is used to identify another image depicting the subject matter, which is also depicted in the one image of the plurality of images, wherein the other image depicts the subject matter at a different instance in time; and displaying, simultaneously with the panoramic image, the other image at a position that is adjacent to the one image of the plurality of images, such that the subject matter is depicted at two instances in time.

8. A method of displaying media objects on an interactive map that depicts a target location, the method comprising:

providing an identification of the target location to an image database, wherein the target location represents a geographic location;

receiving the media objects, each of which depicts a respective image captured from a respective viewing direction that is oriented away from the geographic location, wherein a portion of the media objects includes images captured from a same respective view direction away from the geographic location; and displaying on the interactive map a respective thumbnail version of each media object included in the media objects, wherein each respective thumbnail version is displayed to include an orientation with respect to the target location that reflects the respective viewing direction, wherein a plurality of thumbnail versions are simultaneously displayed at respective orientations and in a configuration that surrounds the target location, such that multiple viewing directions are simultaneously presented, and wherein thumbnails of the portion of the media objects are displayed as a stack of thumbnails that partially overlap one another and represent the images captured in the same respective view direction.

* * * * *